United States Patent
Beregi et al.

[11] 3,859,273
[45] Jan. 7, 1975

[54] PHENYLALANINE COMPOUNDS

[75] Inventors: Laszlo Beregi, Boulogne S/Seine;
Pierre Hugon, Ru Eil-Malmaison;
Jacques Duhault, Chatou;
Jean-Claude Poignant, Bures
S/Yvette, all of France

[73] Assignee: **Science Union Et Cie, Societe
Francaise De Recherche Medicale,**
Suresnes, France

[22] Filed: Feb. 16, 1973

[21] Appl. No.: 333,094

[30] Foreign Application Priority Data
Mar. 6, 1972 Great Britain .................... 10365/72

[52] U.S. Cl. ... 260/239 BF, 260/240 F, 260/293.78,
260/326.32, 424/244, 424/267, 424/274
[51] Int. Cl.. C07d 27/30, C07d 29/28, C07d 41/04
[58] Field of Search.... 260/239 BF, 326.32, 326.41,
260/293.78

[56] References Cited
OTHER PUBLICATIONS

Bergel et al., Chemical Abstracts, Vol. 53, columns 12201–12203, (1959), QDIA51.
Harper et al., Chemical Abstracts, Vol. 45, Column 7193, (1951), QDIA51.
Abshire, Chemical Abstracts, Vol. 70, Abstract No. 47822(e), (1970), QDIA51.

*Primary Examiner*—Alton D. Rollins
*Attorney, Agent, or Firm*—Omri M. Behr

[57] ABSTRACT

Phenylalanine compounds of the formula :

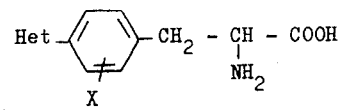

wherein :
X is hydrogen, halogen, methyl, ethyl or trifluoromethyl, and
Het is hexamethyleneimino, piperidino, methylpiperidino, dimethylpiperidino or azabicycloalkyl containing from 5 to 8 carbon atoms, each bonded to the phenyl nucleus by its nitrogen atom.

These compounds are used as medicines in the treatment of central nervous system disorders and alcoholism.

2 Claims, No Drawings

PHENYLALANINE COMPOUNDS

The present invention provides phenylalanine compounds of the general formula I:

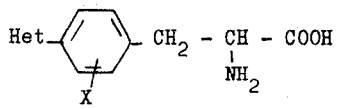

wherein:
X is selected from the group consisting of a hydrogen atom, halogen atoms including fluorine, chlorine and bromine atoms, a methyl radical, an ethyl radical and a trifluoromethyl radical; and
Het is a monocyclic or bicyclic nitrogen containing heterocyclic radical bonded to the phenyl nucleus by its nitrogen atom and selected from the group consisting of hexamethyleimino, piperidino, methylpiperidino, dimethylpiperidino, azabicyclo [3,1,0] hexyl, azabicyclo [3,2,0] heptyl, azabicyclo [3,3,0] octyl, azabicyclo [2,2,2] octyl, azabicyclo [3,2,1] octyl, azabicyclo [4,3,0] nonyl, azabicyclo [3,2,2] nonyl and azabicyclo [3,3,1] nonyl radicals, and basic addition salts, especially physiologically tolerable basic addition salts thereof.

As bases which may be used to form physiologically tolerable addition salts, there may be especially mentioned alkaline metal hydroxides such as sodium and potassium hydroxides.

The compounds of the general formula I are new and they are prepared by reacting a benzaldehyde of the general formula II:

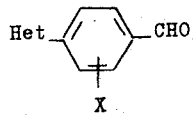

wherein X and Het have the meanings given above, with hippuric acid:

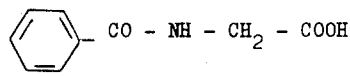

in the presence of acetic anhydride and sodium acetate, then treating the so-obtained oxazolone of the general formula III:

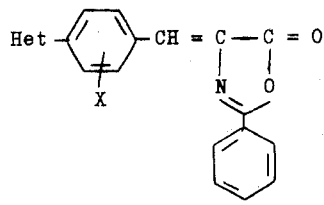

wherein X and Het have the meanings given above, with hydriodic acid and phosphorus.

The oxazolones of the general formula III are also new compounds which may be used as intermediates or starting materials in the chemical and the pharmaceutical industries.

The compounds of the general formula I and physiologically tolerable addition salts thereof possess valuable pharmacological and therapeutic properties, especially they possess an inhibiting action on the central nervous system and they antagonize the effect of alcohol; so they may be used as medicines, especially in the treatment of central nervous system disorders and alcoholism.

The present invention also provides a pharmaceutical preparation containing a compound of the general formula I or a physiologically tolerable basic addition salt thereof in admixture or conjunction with a pharmaceutically acceptable carrier such for example as: distilled water, glucose, lactose, starch, talc, ethylcellulose, magnesium stearate or cocoa butter.

The pharmaceutical forms may be tablets, dragees, capsules, suppositories or injectable solutions, and may be administered by oral, rectal or parenteral route at the dose of from 10 to 100 mg.

The following examples illustrate the invention. The parts are by weight and the melting points were determined on the Kofler block (K) or on the Kofler heater under a microscope (MK).

EXAMPLE 1

Para-hexamethyleneimino phenylalanine

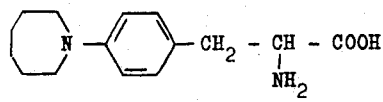

60 parts of acetic anhydride were added to 100 parts of hydriodic acid (d : 1.7), cooled by iced-water, in the course of 15 minutes. 12 parts of red phosphorus and 14 parts of 2-phenyl-4-(para-hexamethyleneimino benzylidene)-5-oxazolone were added to the resulting solution. The reaction mixture was refluxed for one and a half hours and was then cooled and diluted with 70 parts of water. The phosphorus was filtered off and the filtrate was evaporated in vacuo. The residue was taken up with 200 parts of boiling water, was alkalinized with 20 parts of concentrated NH$_4$OH, and the solid obtained was filtered off and was then dried. There were obtained 8.6 parts of para-hexamethyleneimino phenyl alanine, hemihydrate, after recrystallisation from water; M.P. (M.K) 167°–168° C.

The starting 2-phenyl-4-(para-hexamethyleneimino benzylidene)-5-oxazolone was prepared as follows:

14.3 parts of hippuric acid, 24 parts of acetic anhydride and 6.6 parts of fused and powdered sodium acetate were added to 16.3 parts of para-hexamethyleneimino benzaldehyde. The reaction mixture was heated on a steam-bath at 100° C; an exothermic reaction took place, the heating was stopped and the internal temperature rose to 118° C. After completion of the reaction, the mixture was heated at 100° C for 30 minutes. The mixture was then cooled and there were added 40 parts of water and 40 parts of ether. The precipitated solid was filtered and recrystallized from cyclohexane to give 2-phenyl-4-(para-hexamethyleneimino benzylidene)-5-oxazolone, M.P. (K) 154° C.

EXAMPLES 2 to 5

The following compounds were prepared by the method described in Example 1.

2. Para-piperidino phenylalanine, M.P. (MK) 192°–195° C (H$_2$O), starting from 2-phenyl-4-(para-piperidino benzylidene)-5-oxazolone, M.P. (K) 167° C (benzene), itself prepared from para-piperidino benzaldehyde.

3. 3-chloro-4-piperidino phenylalanine, hemihydrate, M.P. (M.K) 183°–186° C (C$_2$H$_5$ OH/H$_2$O), starting from 2-phenyl-4-(3-chloro-4-piperdino benzylidene)-5-oxazolone, M.P. (K) 140° C (cyclohexane), itself prepared from 3-chloro-4-piperidino benzaldehyde.

4. Para-(3-azabicyclo [3,3,0] oct-3-yl) phenylalanine, M.P. (M.K) of its dihydrochloride >350° C (isopropanol), starting from 2-phenyl-4-[para-(3-azabicylo [3,3,0] oct-3-yl) benzylidene]-5 oxazolone, M.P. (K) 213° C (tetrahydrofuran), itself prepared from para-3-azabicylo [3,3,0] oct-3-yl) benzaldehyde.

5. 3-trifluoromethyl-4-[3-azabicylo [3,3,0] oct-3-yl] phenylalanine, M.P. (M.K) 154°–156° C(H$_2$O), starting from 2-phenyl-4-[3-trifluoromethyl-4-(3-azabicyclo [3,3,0] oct-3-yl) benzylidene]-5-oxazolone, M.P. (K) 175° C (acetone), itself prepared from 3-trifluoromethyl-4-(3-azabicyclo [3,3,0] oct-3-yl) benzaldehyde.

We claim:
1. A compound selected from the group consisting of (A) phenylalanine compounds of the general formula:

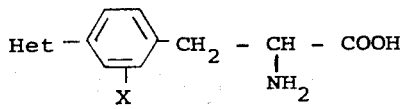

wherein:
X is selected from the group consisting of hydrogen, halogen, methyl, ethyl and trifluoromethyl, and
Het is a nitrogen containing heterocyclic radical bonded to the phenyl nucleus by its nitrogen atom and selected from the group consisting of hexamethyleneimino, piperidino, methylpiperidino, dimethylpiperidino and 3-azabicyclo (3,3,0) octyl;
(B) physiologically tolerable salts thereof with bases.

2. A compound of claim 1 which is para-hexamethyleneimino phenylalanine.

* * * * *